United States Patent [19]
Komasaku et al.

[11] Patent Number: 4,571,844
[45] Date of Patent: Feb. 25, 1986

[54] ANGLE CHANGE DETECTOR

[75] Inventors: Seiichi Komasaku, Yokohama; Hiroshi Iiyama, Yokosuka; Noboru Watanabe, Tokyo; Osamu Tanaka, Kawasaki, all of Japan

[73] Assignee: Jeco Co., Ltd., Kanagawa, Japan

[21] Appl. No.: 502,087

[22] Filed: Jun. 8, 1983

[30] Foreign Application Priority Data

Jun. 9, 1982 [JP] Japan .............................. 57-85633[U]
Jun. 28, 1982 [JP] Japan .............................. 57-97171[U]
Aug. 6, 1982 [JP] Japan ............................. 57-119642[U]
Aug. 26, 1982 [JP] Japan ............................. 57-128864[U]

[51] Int. Cl.$^4$ .......................... G01C 9/06; G01C 9/12
[52] U.S. Cl. ........................................ 33/366; 33/391; 33/402
[58] Field of Search ................... 33/366, 368, 391, 402

[56] References Cited
U.S. PATENT DOCUMENTS 2,803,887  8/1957  Fry ........................................ 33/366
4,277,895  7/1981  Wiklund ................................ 33/366
4,375,727  3/1983  McAdam et al. ..................... 33/366

FOREIGN PATENT DOCUMENTS 143819   9/1980  Fed. Rep. of Germany ........ 33/366
211508  12/1982  Japan ..................................... 33/366

Primary Examiner—Willis Little
Attorney, Agent, or Firm—Charles E. Pfund

[57] ABSTRACT

An angle change detector which can also be used as an inclination angle detector comprises a pair of opposing magnets, a sector-shaped pendulum made of an electro-conductive non-magnetic material and swingable past a spacing between the opposing magnets, and a pair of photosensors disposed on both side edges of the pendulum. Each photosensor comprises a light emitting diode and a phototransistor disposed on both sides of the pendulum. Output signals of the phototransistors are compared with a reference signal for producing an output signal corresponding to the degree of swinging of the pendulum.

2 Claims, 16 Drawing Figures

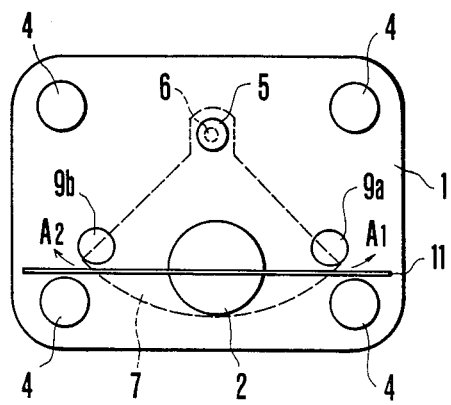
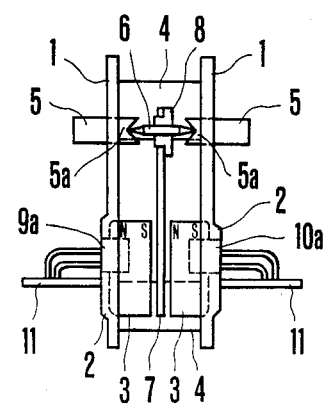
FIG.1  FIG.2
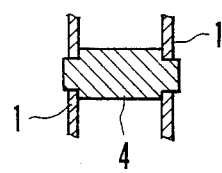
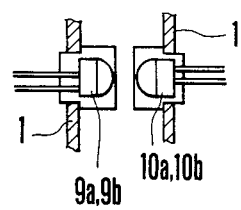
FIG.3  FIG.4

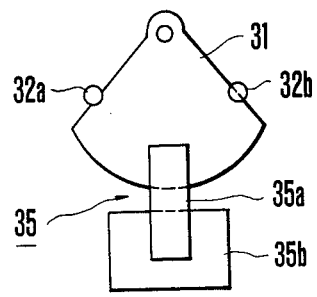
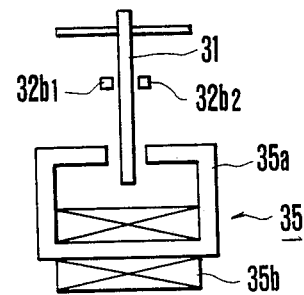
FIG.9  FIG.10
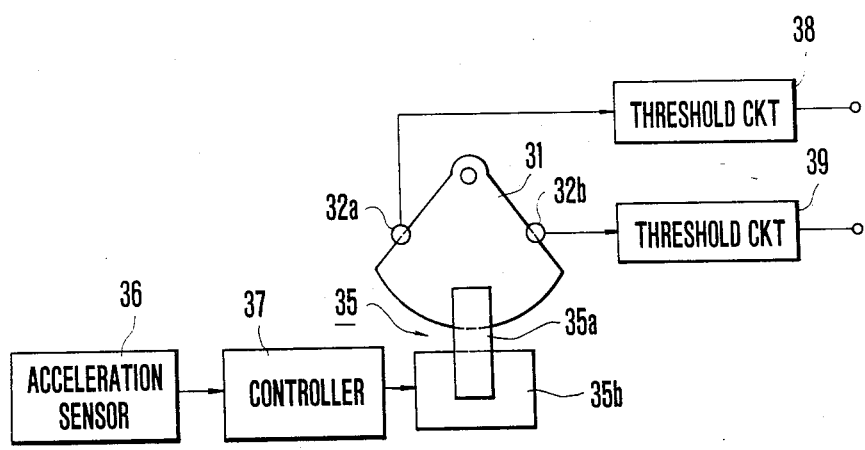
FIG.11

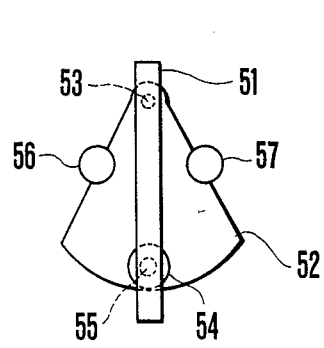
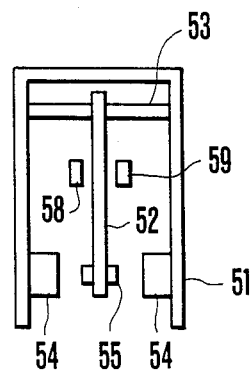
F I G.14   F I G.15
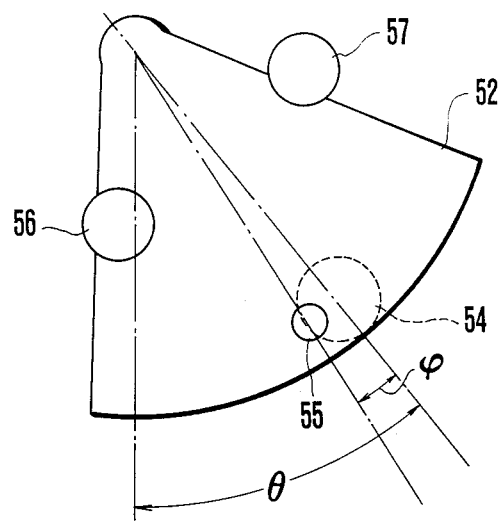
F I G.16

ANGLE CHANGE DETECTOR

BACKGROUND OF THE INVENTION

This invention relates to an improvement in angle change detectors.

In many applications, it is often required to keep a stationary state, for example, a horizontal state and a detector is employed for detecting changes in angle so that the detection results can be used for controlling to keep the horizontal state. An angle detector to be carried on a vehicle is usually provided with an oil damper which can absorb fine vibrations to thereby eliminate influence of vibrations due to irregularity of road surface.

However, the oil damper based on viscosity of oil undergoes hysteresis and for this reason, the detector tends to indicate different angles for the same state before inclination and after recovery from the inclination, resulting in poor detection accuracies.

An approach to this problem is a damper based on air resistance. This type of damper, however, requires a hermetric seal structure which is expensive.

SUMMARY OF THE INVENTION

An object of this invention is to provide an angle change detector of high detection accuracy which is inexpensiveness.

Another object of this invention is to provide an angle change detector capable of extending the detection range of inclination angle.

According to one aspect of the present invention, there is provided an angle change detector comprising a swingable pendulum of an electroconductive non-magnetic material, means for applying magnetic flux to the pendulum, and means for detecting the rotation of the pendulum.

According to another aspect of the present invention, there is provided an angle change detector comprising a swingable pendulum of a non-magnetic material, a magnetic member provided for the pendulum, means for applying magnetic flux to the magnetic member, and means for detecting the rotation of the pendulum.

BRIEF DESCRIPTION OF THE DRAWINGS

FIG. 1 is a front view slowing an embodiment of an angle change detector according to this invention;

FIG. 2 is a side view of the embodiment shown in FIG. 1;

FIG. 3 is a partial sectional view showing a post and side plates shown in FIG. 1;

FIG. 4 shows photosensors;

FIG. 9 is a front view showing an improvement of the embodiment shown in FIG. 1;

FIG. 10 is a side view showing the improvement shown in FIG. 9;

FIG. 11 is a block diagram showing the electrical connection of the improved angle change detector shown in FIG. 9;

FIG. 14 is a front view showing still another modification of the angle change detector;

FIG. 15 is a side view of the modification shown in FIG. 14; and

FIG. 16 is a diagram useful in explaining the operation of the modification shown in FIG. 14.

DESCRIPTION OF PREFERRED EMBODIMENTS

Figure 5:
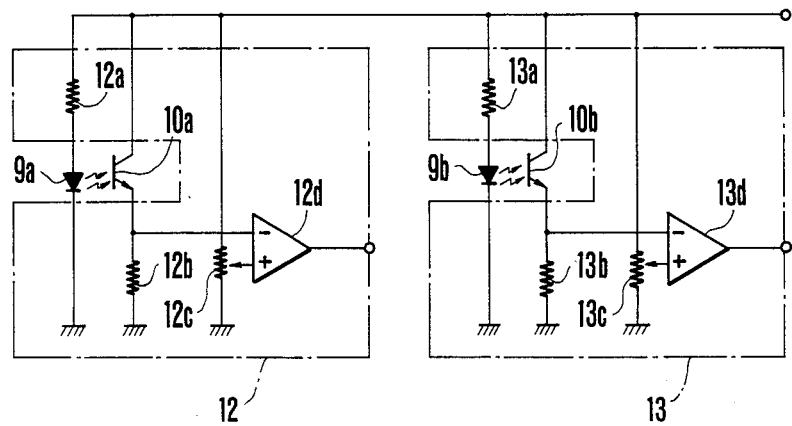
FIG. 5 is a conjunction diagram showing threshold circuits utilized in the embodiment.
Figure 6:
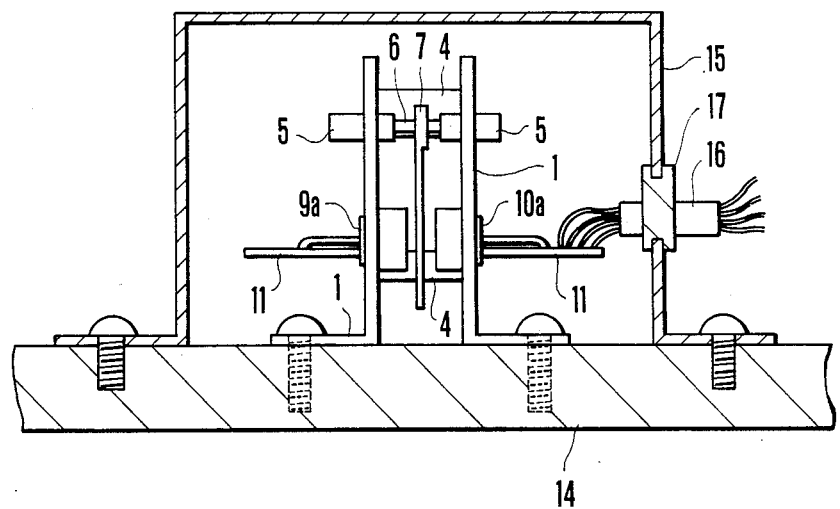
FIG. 6 is a side view showing a manner of mounting the angle change detector of this invention.

FIGS. 1 through 6 show one embodiment of this invention. As shown, this angle change detector comprises a pair of spaced rectangular magnetic plates 1 each having a bulged-out portion 2 near its lower end. The bulged-out portions 2 are formed with recesses for accommodating strong permanent magnets 3, such as cobalt-samarium magnets. The opposing plates 1 are secured together by magnetic posts 4 at their four corners. The posts 4 are shaped as shown in FIG. 3. Bearing Shafts 5 made of gun metal are provided through the plates 1 near their upper ends, and the bearing shafts 5 have opposed pivot portions 5a to support a pivot shaft 6 made of steel, for example. The upper end of a sector-shaped pendulum 7 made of an electroconductive non-magnetic material is pivotally supported by the pivot shaft 6 through a bushing 8 made of gun metal, for example. The lower end of the pendulum 7 substantially coincides with the lower sides of the magnets 3. Light emitting diodes 9a and 9b are provided for one plate 1 at positions adjacent opposite edges of the lower end of the pendulum 7 being in a stationary state, while phototransistors 10a and 10b are provided for the other plate 1 at positions opposing the light emitting diodes 9a and 9b, respectively, as shown in FIG. 4. When the pendulum 7 is at the normal position shown in FIG. 1, about one half of the light emitted by the light emitting diodes 9a and 9b is intercepted by the pendulum 7. A threshold circuit to be described later is mounted on a board 11 shown in FIGS. 1 and 2.

It will be appreciated from the foregoing description that the magnets 3 constitute means for applying magnetic flux to the pendulum 7 and the opposing light emitting diode 9a and phototransistor 10a as well as the opposing light emitting diode 9b and phototransistor 10b constitute means for detecting the rotation of the pendulum 7.

FIG. 5 shows the details of the threshold circuits 12 and 13 of the same construction. The threshold circuit 12 detects the fact that the output signal of the phototransistor 10a becomes larger than a threshold level and is constituted by resistors 12a and 13b, a variable resistor 12c and a comparator 12d. The threshold circuit 13 detects the fact that the output signal of the phototransistor 10b becomes larger than the threshold level and is constituted by the same elements as the threshold circuit 12. The angle change detector described above is secured to a supporting plate 14 and covered by a cover 15 provided with a rubber bushing 17 for holding a lead wire 16.

The angle change detector having a construction as described above operates in the following manner. Thus, the magnetic flux produced by the right magnet 3 reaches the left magnet 3 after passing through the pendulum 7 and then returns back to the right magnet 3 through left plate 1, posts 4 and right plate 1. Since plates 1 and posts 4 are made of magnetic material, they form a magnetic path of low reluctance thus preventing leakage of the magnetic flux. Under stationary state, phototransistors 10a and 10b receive equal quantity of light so that the voltage drops across resistors 12b and 13b are also equal. When the variable resistors 12c and 13c are adjusted such that the voltages supplied to the non-inverting input terminals of the comparators 12d and 13d are slightly higher than the voltages supplied to inverting terminals of the comparators, the output of the comparators would become "1" level.

When the pendulum 17 inclines toward the right, the light impinging upon the phototransistor 10b would not be intercepted so that the voltage drop across resistor 13b would become larger than normal. As a consequence, the voltage supplied to the inverting input terminal of comparator 13d would become larger than that supplied to the non-inverting input terminal with the result that the output of the comparator 13d would become "0" level. On the other hand, since the light impinging upon the phototransistor 10a is perfectly intercepted by the pendulum 7, the voltage drop across resistor 12b becomes zero. Consequently, the relative magnitude of the voltages supplied to two input terminals of the comparator 12d does not change so that the output voltage of the comparator 12d is still at the "1" level.

Conversely, when the pendulum inclines to the left, the quantity of light supplied to the phototransistor 10a increases to increase the voltage drop across resistor 12d so that the output of the comparator 12d is at "0" level. In this manner, as the pendulum inclines to the right, the comparator 13d produces a "0" level output signal, whereas when the pendulum inclines to the left, the comparator 12d produces a "0" level output signal whereby angle change and direction of inclination can be detected. These output signals are led out through lead wire 16.

When the inclination angle detector is mounted on a motor car, the pendulum is caused to swing by vibration caused by irregular load surface. However, since the pendulum is made of electroconductive material, eddy current is induced in the pendulum when it swings in the magnetic field, whereby the eddy current interacts with the flux to create electromagnetic force in a direction opposite to the force due to the swinging and applied to the pendulum, thus braking the pendulum to absorb swinging thereof. Since this braking is electromagnetic braking, there is no hysteresis effect. Moreover, since the comparators 12d and 13d are hysteresis free, detections of inclination and restoration can be made at the same position.

While in the foregoing embodiment the magnets 3 oppose the pendulum to apply thereto magnetic flux, a yoke may be used which is combined with a magnet and directs magnetic flux therefrom to opposing ends adjacent to the pendulum 7. Also, the magnet 3 may be an electromagnet. The rotation of the pendulum 37 detected optically in the foregoing embodiment may be detected electrically or magnetically. When the amount of magnetic flux to be applied to the pendulum 7 is regulated by adjusting the distance between the pendulum 7 and magnet 3 or by adjusting the amount of current supplied to the coil of electromagnet, the braking can be set to a desired condition.

Figure 7:
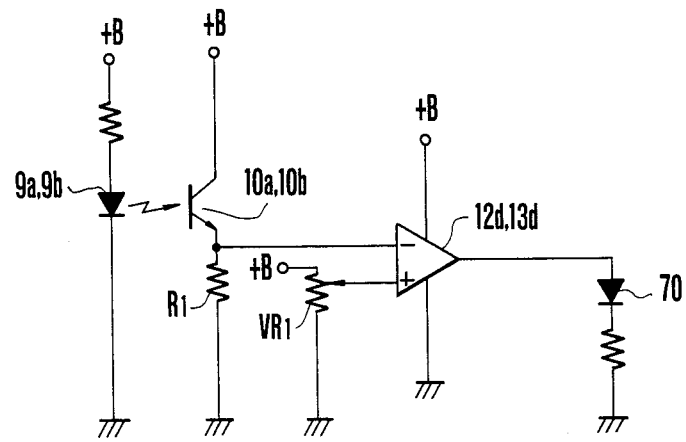
FIG. 7 is a circuit diagram for explaining the threshold circuit.

Here, the threshold circuit 12 or 13 will be described in greater detail with reference to FIG. 7.

When the emitter voltage of the phototransistor 9a or 9b (voltage drop across a resistor R1) is higher than the reference voltage set by a variable resistor VR1, the voltage of the output terminal of the comparator 12d or 13d becomes the ground ("0") level so that a light emitting diode 70 connected to the output terminal does not luminesce, whereas when the emitter voltage becomes lower than the reference voltage, the output voltage of the comparator 12d or 13d becomes equal to +B ("1" level) so that the light emitting diode 70 luminesces, thereby indicating in which direction the pendulum is inclined. Consequently, when the reference voltage is decreased by adjusting the variable resistor VR1, the light emitting diode 70 luminesces when the pendulum 7 swings greatly in the direction of A1 or A2 (see FIG. 1) but when the reference voltage is increased, the light emitting diode 70 luminesces when the pendulum 7 swings only a little in the direction A1 or A2. Thus, the horizontal position displayed by the detector can be adjusted by fixing the reference voltage of the comparator connected to one photosensor (for example, 9a and 10a), and by adjusting the reference voltage of the comparator connected to the other photosensor (9b and 10b) by moving the movable contact of the variable resistor VR1. When the reference voltages of both the photosensors are decreased or increased, the angle of inclination from the correct horizontal position can be widened or narrowed.

Figure 8:
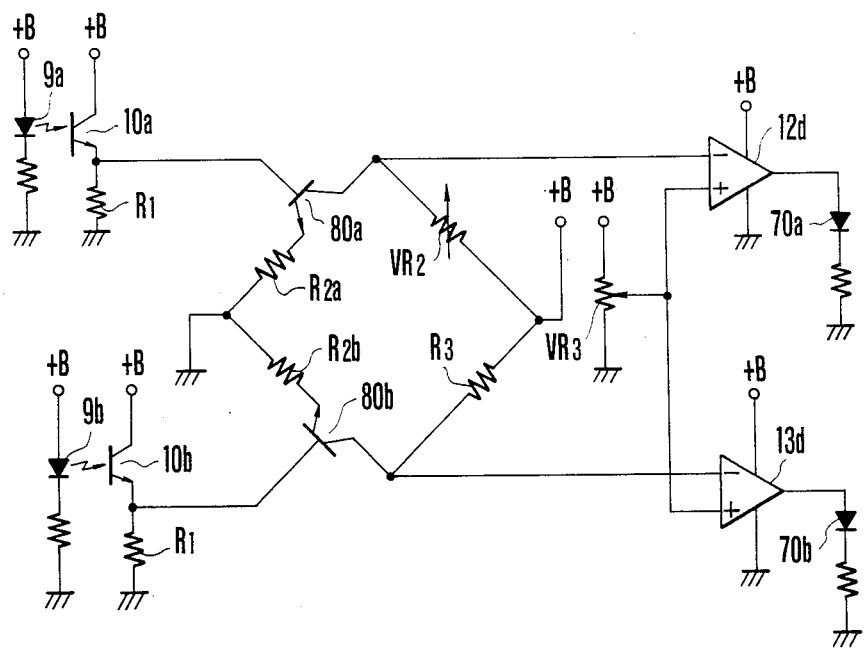
FIG. 8 is a circuit diagram showing a modified threshold circuit.

FIG. 8 shows a connection diagram of a modified threshold circuit of this invention. In FIG. 8, the emitter electrodes of phototransistors 10a and 10b are respectively connected to the base electrodes of transistors 80a and 80b, while the emitter electrodes of transistors 80a and 80b are respectively connected to one terminal of resistors $R_{2a}$ and $R_{2b}$, the other ends of these resistors $R_{2a}$ and $R_2$ being connected together and grounded. The collector electrodes of transistors 80a and 80b are respectively connected to the inverting input terminals of comparators 12d and 13d and to one end of a variable resistor VR$_2$ and a fixed resistors R$_3$, the other ends of these resistors being connected to +B. The resistors $R_{2a}$, $R_{2b}$, VR$_2$, R$_3$ and transistors 80a and 80b constitute a bridge circuit. The non-inverting input terminals of the comparators 12d and 13d are connected to the movable contact of a variable resistor VR$_3$ so as to be supplied with a reference voltage.

Where the detector with the circuit shown in FIG. 8 is positioned in a precise horizontal position, even when the emitter voltages of the phototransistors 10a and 10b may differ from each other due to the positional error of both the photosensors, it is possible to adjust the horizontal position displayed by the detector by making the same the collector voltages of the transistors 80a and 80b through adjustment of the variable resistor VR$_2$. Furthermore, it is possible to widen or narrow the range of inclination angle from the detector horizontal position by decreasing or increasing the reference voltage by adjusting the variable resistor VR$_3$.

It will be understood that with the circuit arrangements described above, correct horizontal state can be detected even when the photosensors are not positioned at correct horizontal criterion at the time of manufacturing, and besides, it is possible not only to adjust the horizontal position but also the range of inclination angle from the horizontal position. With the foregoing embodiments however, since the braking force is fixed, when the force acting upon the pendulum is small, the braking force becomes excessive and vice versa so that when the motor car accelerates or decelerates rapidly, the operation of the angle change detector becomes erroneous.

FIGS. 9 to 11 show an improved embodiment which is effective to exert suitable braking force upon the pendulum and to prevent errors in detection due to rapid acceleration or deceleration. In FIGS. 9 to 11, the pendulum 31 and photosensors 32a, 32b are identical to those shown in FIGS. 1 and 2, and a single electromagnet 35 substitutes for permanent magnets 3. The electromagnet 35 comprises a magnetic yoke 35a having an air gap for receiving the lower portion of the pendulum 31 and an exciting coil 35b.

This modified angle change detector is connected a shown in FIG. 11. These are provided an acceleration sensor 36, a controller 37 which is response to the output of the acceleration sensor 36 controls the magnetic flux produced by the electromagnet 35, and threshold circuits 38 and 39 identical to the threshold circuits 12 and 13 shown in FIG. 5 and connected to photosensors 32a and 32b respectively for producing output signals when the outputs of the photosensors 32a and 32b exceed predetermined threshold levels. As in the previous embodiments, the photosensor 32b comprise a light emitting diode 32b1 and a phototransistor 32b2 (see FIG. 10) while the photosensor 32a comprises a light emitting diode 32a1 and a phototransistor 32a2 (not shown).

The modified angle change detector operates as follows. Thus, when the motor car accelerates, the acceleration sensor 36 produces an acceleration signal. In response to this acceleration signal, the electromagnet 35 produces magnetic flux corresponding to the acceleration. A force corresponding to the acceleration is also applied to the pendulum 31, but when it moves even a little, a braking force is applied to the pendulum by eddy current induced therein in the same manner as described above. Since the braking force is proportional to the acceleration, an optimum braking force corresponding to the acceleration is always applied to the pendulum 31, thus preventing swinging of the pendulum caused by acceleration. Accordingly, no detection error would be caused at the time of rapid acceleration or deceleration. This is also true when the car vibrates slightly due to irregular road condition because a braking force corresponding to acceleration caused by slight swinging is applied to the pendulum. In other words erroneous detection can be prevented when even a small vibration occurs.

When the car is running at a constant speed or standstill, no acceleration is applied to the pendulum 31 so that no braking force is applied thereto. When the car inclines, the pendulum 31 swings so that photosensor 32a or 32b produces an output signal which is supplied to the threshold circuit 38 or 39. The construction and operation of these threshold circuits are identical to those of the threshold circuits 12 and 13 shown in FIG. 5.

In the embodiment shown in FIG. 11, when a speed sensor substitutes for the acceleration sensor 36 and when the characteristic of the controller 37 is modified such that it supplies smaller current to the coil 35 as the car speed increases, the braking force acting upon the pendulum 31 decreases as the car speed increases, thereby increasing the sensitivity of the detector. Accordingly, it is possible to detect inclination of the car at a high sensitivity, thus preventing accidents. Furthermore, when the acceleration sensor 36 is replaced by an inclination sensor and when the characteristic of the controller 37 is modified such that the current supplied to the coil 35a decreases as the inclination increases, the restoring time of the pendulum 31 can be minimized when the inclination disappears.

Figure 12:
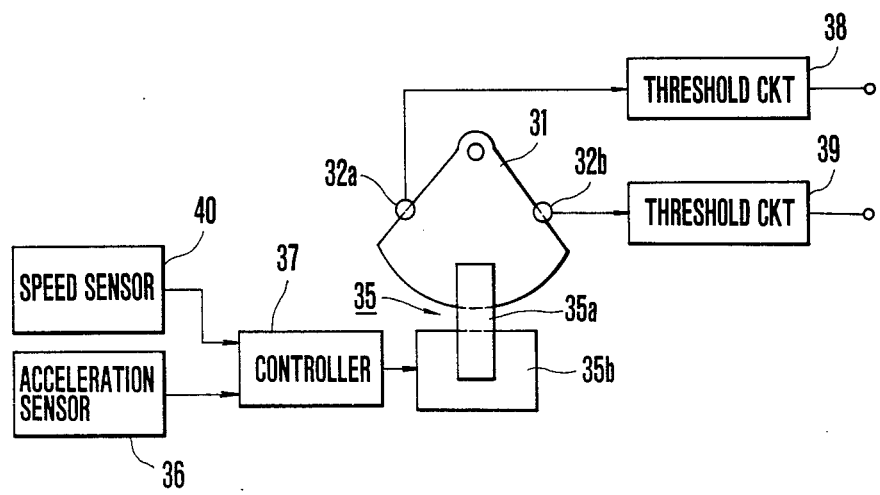
FIG. 12 is a modification of the circuit shown in FIG. 11 in which a speed sensor is added.

Still another modification shown in FIG. 12 is similar to that shown in FIG. 11 except that a speed sensor 40 is added. According to this modification, when the acceleration is larger than the speed signal as at the time of starting of a motor car, the acceleration signal applies a large braking force to the pendulum 31, thus preventing swinging thereof caused by inertia. On the other hand, when the car runs at a high speed, the speed signal becomes larger than the acceleration signal so that a braking force proportional to the speed signal is applied to the pendulum 31. Accordingly, any detection error can be prevented even when the car body vibrates greatly due to poor road condition.

Figure 13:
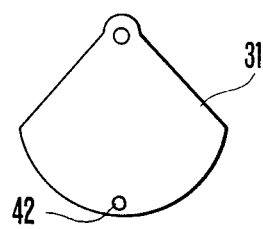
FIG. 13 is a modification of the pendulum in which a magnetic piece is added to the bottom portion of the pendulum utilized in the embodiment shown in FIGS. 11 and 12.

In FIG. 13, a small magnetic piece 42 is secured to the lower portion of the pendulum 31 shown in FIGS. 9 to 11. With this construction, when current is supplied to the exciting coil 35a upon return of the pendulum 31 to the normal or vertical position, the force acting upon the magnetic piece 42 is added to gravity, thereby quickly returning the pendulum 31.

It is possible to form an angle change detector having a desired characteristic by varying the number of the sensors, or by modifying the characteristic of the controller 7 such that its output is inversely proportional to its input or that its output is proportional to its input.

In the foregoing embodiment, independent acceleration sensor and angle sensor were provided. But since the swinging is proportional to the acceleration or inclination angle, the signal obtained by passing the output signals of the phototransistor 10a or 10b shown in FIG. 5 through a logical sum circuit becomes an acceleration signal or an angle signal. When this signal is supplied to the controller 37, it is possible to use the photosensors 32a and 32b as acceleration sensors or inclination sensors.

Where a pair of photosensors each comprising a light emitting diode and a phototransistor are disposed on opposite side edge of a swingable weight or a pendulum as shown in FIG. 1, the areas of the light receiving surface of the phototransistor is relatively small so that all light to the phototransistor will be intercepted when the pendulum swings a little. In other words, with the apparatus shown in FIG. 1, only a narrow range of inclination can be detected.

A further embodiment shown in FIGS. 14 and 15 has a construction capable of detecting inclinations in a wider range.

This modification comprises a U-shaped frame 51 secured to a console, not shown, a non-magnetic sector-shaped pendulum 52 with its upper end pivotally supported by a horizontal shaft 53 supported by the frame 51, and a pair of permanent magnets 54 secured to the inner sides of the frame 51 to oppose the lower end of the pendulum 52. A small magnetic piece 55, for example, an iron piece, extends through the lower end of the pendulum to exactly oppose the permanent magnets 54 when the pendulum 52 is in horizontal position. Photosensors 56 and 57 are disposed to oppose opposite side edges of the pendulum 52. Each photosensor is constituted by a light emitting diode 58 and a phototransistor 59 disposed on both sides of the pendulum 52. Under a normal condition, about one half of the light emitted by the light emitting diodes is intercepted by the pendulum. It will be appreciated that the magnets 54 constitute means for applying magnetic flux to the magnetic piece 55, and the photosensors 56 and 57 constitute means for detecting the rotation of the pendulum 52.

In operation, when the angle change detector is inclined, the pendulum 52 rotates by an angle corresponding to an inclination. Without the magnetic piece 55, the inclination of the detector would equal the rotation of the pendulum 52. In the presence of the magnetic piece 55, however, this magnetic piece 55 is attracted by the magnets 54 so that the rotation of the pendulum 52 is reduced as compared to the rotation thereof produced in the absence of the magnetic piece 55. Changes in light quantity in the photosensors 56 and 57 are due to interception of light incident to the light receiving surface of the photosensors 56 and 57 by the pendulum 52 being in rotation. Since the area of the light receiving surface of the photosensors 56 and 57 is predetermined, the amount of rotation of the pendulum 52 necessary for causing the light quantity in the photosensors 56 and 57 to change is also predetermined. Therefore, the more the amount of inclination of the detector necessary for providing the pendulum 52 with the predetermined rotation, the more the range of inclination detection becomes extended.

A description will be given to quantitatively explain the above relationship by referring to FIG. 16.

When the angle change detector is inclined by $\theta$ to the left, the magnets 54 and photosensors 56 and 57 are also inclined by $\theta$. Under this condition, the pendulum 52 with the magnetic piece 55 is attracted by the magnets 54. However, the pivotally mounted pendulum 52 is then retraced by gravity so as to return by $\psi$ from the inclination $\theta$ of the detector. Then, the following relation is established between a moment due to gravity and a moment due to attraction force caused by the magnets 54 and acting on the pendulum 52:

$$I_G = Mgl_G \sin(\theta - \phi) \quad (1)$$

$$Imag = m\alpha \left[ \left( \frac{dH}{dx} \right)_{x=\phi l} \right] l \quad (2)$$

where $I_G$: moment of the pendulum due to gravity
g: gravitational acceleration
$l_G$: position of centroid of pendulum relative to rotary axis
Imag: moment due to attaction force of magnets
m: mass of iron piece
$\alpha$: magnetization per unit mass of iron piece
H: intensity of magnetic field generated by magnets
l: distance between rotary axis and iron piece When $\psi$ is small, $(dH/dx)x = \psi l \approx K\psi l$ where K is a constant. Then, from equations (1) and (2), equation (3) can be derived.

$$Mgl_G \sin(\theta - \phi) = m\alpha \left[ \left( \frac{dH}{dx} \right)_{x=\phi l} \right] l \quad (3)$$

$$= m\alpha K\phi l^2$$

Assuming now that $\psi << \theta$ equation (4) can be obtained.

$$\phi = \frac{M_g l_G}{m\sigma K\phi l^2} \sin\theta \quad (4)$$

Equation (4) shows that the amount of retreat $\psi$ of the pendulum 52 from the inclination $\theta$ of the magnets 54 can desirably be determined by selecting the constant. An experiment conducted by the inventors of the present application has proven that the relation as expressed by equation (5) holds between $\psi$ and $\theta$.

$$\psi \approx 0.1 \sin\theta \quad (5)$$

In this manner, the rotation $\psi$ of the pendulum 52 when the inclination $\theta$ takes place can be minimized so that, as previously explained, the detection range of inclination can be extended.

In this embodiment, the magnets 54 are so disposed as to oppose the iron piece 55 when the angle change detector is positioned horizontally but they may be disposed with an inclination of $\theta$ relative to the vertical axis when the detector is in horizontal position. In such a case, the iron piece 55 is shifted by $(\theta - \psi)$ from the vertical axis toward the magnets 54 when the detector is in horizontal position.

We claim:
1. An angle change detector comprising:
   a swingable pendulum of an electroconductive non-magnetic material;
   means for applying magnetic flux to the pendulum; and
   means for detecting the rotation of the pendulum;
   wherein said magnetic flux applying means comprises a pair of opposing magnets supported by a magnetic plate frame, said pendulum is pivotally mounted to the magnetic plate frame, said pendulum is pivotally mounted to the magnetic plate frame to swing past a spacing between the opposing magnets, and said detecting means comprises two photosensors disposed near opposite side edges of said pendulum and adjustable threshold circuits respectively connected with the two photosensors to produce an output signal when an output signal from the photosensor exceeds a predetermined selectable threshold level.

2. An angle change detector comprising:
   a swingable pendulum of an electroconductive non-magnetic material;
   means for applying magnetic flux to the pendulum; and
   means for detecting the rotation of the pendulum;
   wherein said magnetic flux applying means comprises an electromagnet with a magnetic gap, said pendulum swings past the magnetic gap, and said detecting means comprises two photosensors disposed near opposite side edges of said pendulum and adjustable threshold circuits respectively connected with the two photosensors to produce an output signal when an output signal from the photosensor exceeds a predetermined selectable threshold level, and wherein said detector further comprises a controller adapted to control magnetic flux generated by said electromagnet; and further comprising at least one sensor for detecting one of acceleration or deceleration of a vehicle carrying said detector and rotation of said pendulum, wherein said controller is responsive to an output signal from said one sensor to control magnetic flux generated by said electromagnet.

* * * * *